No. 615,360. Patented Dec. 6, 1898.
J. & B. MILLOT.
DRIVING GEAR FOR MOTOR VEHICLES.
(Application filed Aug. 24, 1898.)
(No Model.) 2 Sheets—Sheet 1.

No. 615,360. Patented Dec. 6, 1898.
J. & B. MILLOT.
DRIVING GEAR FOR MOTOR VEHICLES.
(Application filed Aug. 24, 1898.)

(No Model.) 2 Sheets—Sheet 2.

Witnesses:
Thomas F. Wallace
René Bruine

Inventors:-
Joseph Millot and Benoit Millot
By their Attorneys
Arthur C. Fraser & Co.

THE NORRIS PETERS CO., PHOTO-LITHO., WASHINGTON, D. C.

UNITED STATES PATENT OFFICE.

JOSEPH MILLOT AND BENOIT MILLOT, OF GRAY, FRANCE.

DRIVING-GEAR FOR MOTOR-VEHICLES.

SPECIFICATION forming part of Letters Patent No. 615,360, dated December 6, 1898.

Application filed August 24, 1898. Serial No. 689,386. (No model.)

*To all whom it may concern:*

Be it known that we, JOSEPH MILLOT and BENOIT MILLOT, citizens of the Republic of France, residing in Gray, (Haute-Saône,) France, have invented new and useful Improvements in Driving-Gears Especially Applicable to Motor or Self-Propelled Vehicles, which invention is fully set forth in the following specification.

This invention relates to improvements in driving-gear especially applicable to motor or self-propelled vehicles.

In self-propelled or motor vehicles the motors communicate a rotary movement to the shaft carrying the differential gear usually by means of three sets of gear-wheels giving three velocities, which the attendant employs, according to the state of the route or according to requirements. To appreciate the disadvantage attaching to this arrangement, it is only necessary to mount a vehicle provided with the same and to push once only the lever by means of which one pair of wheels is brought out of gear in order to put another pair into gear. Before the necessary skill required for this operation has been acquired it will be unusual if the whole set of wheels forming this primitive transmitting mechanism is not seriously damaged. To obviate this disadvantage, some vehicles are provided with a belt transmission. The variations in speed are, it is true, thereby more easily effected; but this method of transmission is so cumbrous by reason of the number of pulleys necessary that with two speeds only the whole of the vehicle-frame is utilized. Now according to our invention we provide an arrangement which without disengaging the teeth of the wheels gearing together gives three speeds in a forward direction and without any complication one speed in a backward direction. It is very simple, occupies a small space only, and all its operative parts can be inclosed in an oil-bath designed to preserve them from wear.

To enable the invention to be fully understood, we will describe it by reference to the accompanying drawings, in which—

Figure 1:
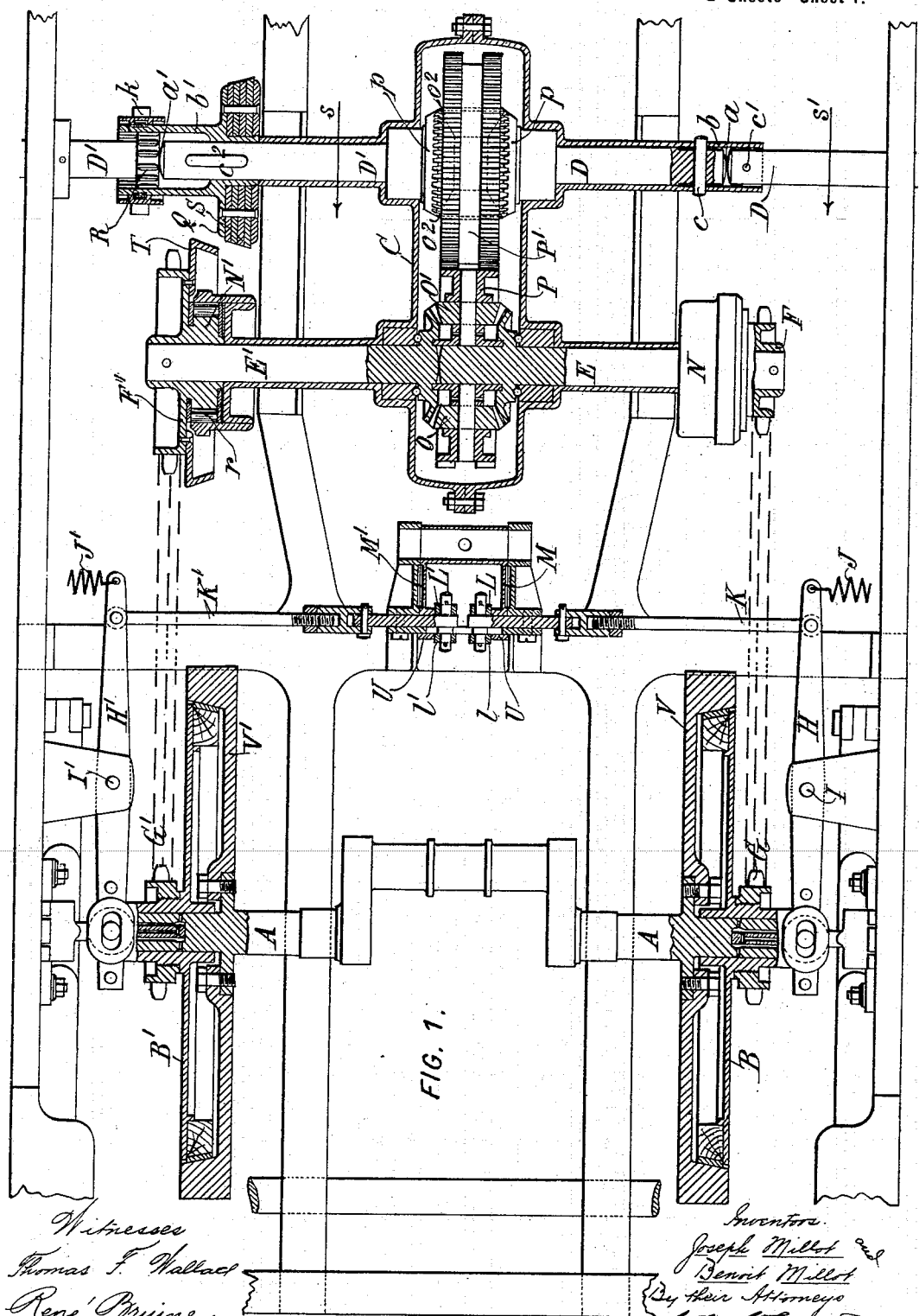
Figure 3:
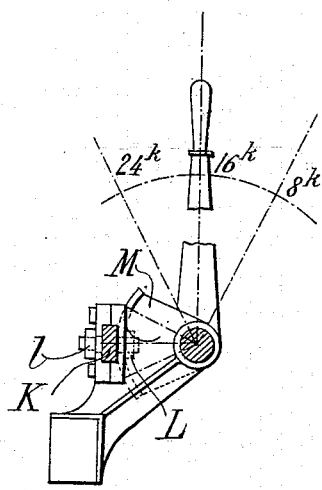
Figure 4:
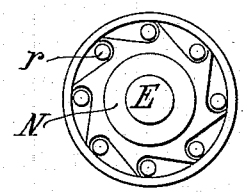
Figure 2:
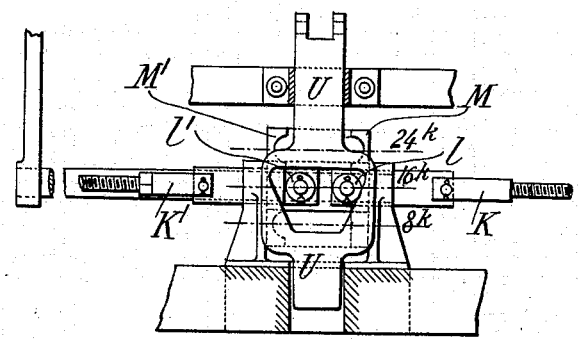

Figure 1 is a plan of the front part of the frame of a vehicle having our driving-gear, and Figs. 2, 3, and 4 are views of details.

A is the main or crank shaft of the motor, the said shaft carrying at its two ends hollow fly-wheels V V', from which motion can be derived by the friction-wheels B and B'.

C is a brass box inclosing two differential gears of ordinary construction, except that the wheels P and P', which carry the small bevel-pinions, are toothed and gear together. One of these parts fulfils the ordinary role of the differential gear, and the extensions of the spindles D and D' are provided outside the frame with chain-pinions, which drive the rear wheels of the vehicle.

The shafts E and E' carry chain-wheels F and F', which can be driven either separately or simultaneously from the chain-wheels G and G', rigidly secured to the friction-wheels B and B'.

H and H' are levers pivoted at I and I' and which under the action of springs J and J' apply the friction-wheels to the fly-wheels. The rods K and K', (see the detail view Fig. 2,) which are provided at their ends with rollers L and L', enable one or the other of the friction-wheels B and B', or both simultaneously, to be put into or out of gear by means of the sectors M and M'. One of these sectors is shown in side elevation in Fig. 3. The said sectors M and M' assume three operative positions. In the first the friction-wheel B' alone is put into gear. It gives to the shaft E' a velocity of a certain number of revolutions, which is reduced to a half by the planetary motion of the small pinions o and o'. The wheel P' then rotates at a certain velocity, suitable for transmitting to the vehicle-wheels the first velocity—for example, about eight kilometers an hour. In the second position of the sectors M and M' the wheel B alone is in gear. It rotates the shaft E at a velocity suitable for transmitting, as above mentioned for the first position, the second velocity of the vehicle—for example, about sixteen kilometers an hour. In the third position of the sectors M and M' the two friction-wheels B and B' are simultaneously put into gear, and the wheel P' of the differential gear receives a velocity equal to the sum of the two first velocities. It therefore imparts to the vehicle a third speed of about twenty-four kilometers an hour. To reduce the speed of the vehicle and, if necessary, to completely stop it whatever the position of the sectors, the attendant by pressing upon a pedal raises the frame U, of which the two inner faces are inclined and which by coming into contact with the rollers $l$ and $l'$, provided in alinement with the rollers L and L', can partially or wholly disengage the friction-gear without the necessity of operating the lever which actuates the sectors M and M'.

Each of the chain gear-wheels F and F' is provided at N and N' with roller ratchet-gear $r$, which only allows the shafts E and E' to rotate in the direction of movement of the driving-shaft A. (Fig. 4 shows one of these ratchet arrangements in elevation.) When either one of the friction-wheels B and B' is in gear—for example, the wheel B—the shaft E is rotated, and as the wheel P has to overcome resistance in order to propel the vehicle the shaft E' tends to turn in a direction opposite to that in which the shaft E rotates. The ratchet devices which are carried by the chain-wheels F and F' oppose this movement. Any suitable arrangement of ratchet-gear will produce the same result; but the arrangement above described does not make any noise, and the small rollers, which have little play in the teeth, enter into gear without jarring. With this arrangement of ratchet-gear the vehicle can stop on inclines without the fear of its running backward under the action of its own weight.

The extension of the shaft D is divided at $a$, and the two parts are connected by a sleeve $b$ and two keys or cotters $c$ $c'$ at right angles to one another. The extension D' is also divided at $a'$, and the two parts are connected by the sleeve $b'$, which is rigidly connected to or is in one with the cone Q (the function of which is hereinafter explained) and the key $c^2$, which engages in a long slot in the shaft D', the said sleeve $b'$ being provided internally with teeth which engage with teeth R on the other part D'.

The cone Q is employed in connection with the backward movement of the vehicle. To this end the attendant from his seat causes the cone by means of a lever $k$ to slide outward. The teeth R, which are formed upon the extension of the shaft D', first disengage themselves from the internal grooves in the sleeve $b'$ of the cone Q, the surface S of which is then brought into contact with the pulley T. If at this instant the friction-wheel B' be brought into gear, the vehicle runs backward by reason of the relative motion communicated to the shaft D. In this backward movement the wheel driven by the shaft D is the only driven agent. It is driven by the differential gear P', which in the ordinary manner facilitates the movement of the vehicle along curved paths.

With regard to the differential gear P' this is composed, as usual, of two pinions $o^2$ $o^2$, symmetrically placed, rotating in the wheel P' and gearing with the bevel-wheels $p$ $p$, carried by the shafts D and D'. Assuming the wheel P' to be immovable, the well-known reversing arrangement is obtained. As a matter of fact if the shaft D' has a velocity of twenty revolutions, for example, in the direction of the arrow $s$ the shaft D will make the same number of revolutions in the opposite direction. Such is the result which is obtained when the friction-cone Q is brought into gear and the friction-wheel B' is in gear; but as a result of the combined arrangements of the two differential gears P and P' the wheel P' cannot be immovable, as it is actuated by the wheel P. In the example chosen, which supposes that when B' is in gear a velocity of eight kilometers an hour is obtained, the wheel P' makes by reason of its engagement with the wheel P five revolutions a minute in the direction of the arrow $s$, and the wheel $p$, keyed upon the shaft D', will make the number of revolutions due to the engagement of the cone Q with the pulley T, for example, twenty; but the small pinions $o^2$ $o^2$ will rotate at a higher velocity. They will tend to rotate the shaft D at twice the speed that it receives—for instance, ten revolutions per minute in the direction of the arrow $s'$—as is the case when the vehicle is propelled forward. The double movement of rotation and of translation of the small pinions $o^2$ $o^2$ therefore tends (with the assumed number of revolutions we have chosen) to give to the shaft D a speed of twenty revolutions a minute in a backward direction and ten revolutions only in a forward direction. The said shaft therefore rotates at a speed of ten revolutions in the backward direction. The number of revolutions chosen cannot be thus employed in practice, and the three velocities of eight, sixteen, and twenty-four kilometers, which we have given as an example for the forward velocity of the vehicle, can be increased or diminished, as desired.

We claim—

1. In driving-gear especially applicable to self-propelled vehicles the arrangement upon the shaft A of the motor of two fly-wheels V, V' which can be either separately or simultaneously put into gear for separately or simultaneously operating two wheels G, G' connected by chains with wheels F, F' mounted upon shafts E, E' of a first differential gear arranged upon an intermediate shaft in such a manner that the speed of the wheel P of the said first differential gear depends upon the velocity obtained by putting V and B or V' and B' into gear or to the sum of these two velocities, substantially as hereinbefore described and illustrated in the accompanying drawings.

2. In driving-gear of the kind described in claim 1 the combination with the first differential gear of a second differential gear arranged in the usual manner upon the driving-shafts of the two wheels, the wheel P' of the second differential gear gearing with the wheel P of the first, substantially as described and illustrated.

3. In an arrangement of the kind described operating the gear V, B, V', B' by spring-controlled levers H, H' actuated by rods K, K' carrying rollers L, L' which follow the curves of the sectors M, M', the said sectors being adapted to be lowered or raised, substantially as described and illustrated.

4. In an arrangement of the kind described the combination of additional rollers $l$, $l'$ and of the rods K, K' with a frame U having inclined inner faces which by rising cause the rods K, K' to suddenly approach one another and thereby suddenly reduce the speed of or stop the vehicle, substantially as described and illustrated.

5. In an arrangement of the kind described the connection of the chain-wheels F, F' with their respective shafts E, E' by ratchet-gear N, N' preferably of the kind having rollers $r$, whereby the rotation of the shafts can only take place in the direction of motion of the motor, substantially as described and illustrated.

6. In driving-gear of the kind described the arrangement upon the extension of the shaft D' of a movable friction-cone Q which can be brought into contact with a cone T mounted upon the extension of the shaft E' of the intermediate differential gear, the combined movement of the two differential gears P, P' with the gear T, Q having as a result that, when the lower velocity-wheel B' is put into gear, the wheel which actuates the shaft extension D is rotated backward with a diminished velocity, substantially as described and illustrated in the accompanying drawings.

In testimony whereof we have signed this specification in the presence of two subscribing witnesses.

JOSEPH MILLOT.
BENOIT MILLOT.

Witnesses:
ALBERT ROUGETET,
MAURICE BILLOT.